United States Patent [19]

Nakauchi

[11] 4,160,164

[45] Jul. 3, 1979

[54] FLAME SENSING SYSTEM

[75] Inventor: Shunsaku Nakauchi, Mitaka, Japan

[73] Assignee: Security Patrols Co., Ltd., Tokyo, Japan

[21] Appl. No.: 825,387

[22] Filed: Aug. 17, 1977

[30] Foreign Application Priority Data

Feb. 15, 1977 [JP] Japan ........ 52-14639

[51] Int. Cl.[2] ........ G01J 1/00

[52] U.S. Cl. ........ 250/339; 250/340

[58] Field of Search ........ 250/338, 339, 340, 351, 250/503, 554

[56] References Cited

U.S. PATENT DOCUMENTS

| | | | |
|---|---|---|---|
| 3,026,413 | 3/1962 | Taylor | 250/339 |
| 3,539,807 | 11/1970 | Bickel | 250/338 |
| 3,903,418 | 9/1975 | Horn | 250/338 |

*Primary Examiner*—Alfred E. Smith

*Assistant Examiner*—Janice A. Howell

*Attorney, Agent, or Firm*—Cameron, Kerkam, Sutton, Stowell & Stowell

[57] ABSTRACT

The present invention is concerned with a flame sensing system utilizing infra-red rays by resonant radiation of carbon dioxide which system gives no erroneous information due to discharge of thunder, solar light or the like and has high sensitivity and S/N ratio. The flame sensing system according to the invention is characterized in that a flame is detected continuously for a short time in terms of difference in intensity between a first infra-red rays of a first wavelength produced by resonant radiation of carbon dioxide and a second infra-red rays of a wavelength located in the vicinity of said first wavelength in the region of wavelength in which there is little absorption by carbon dioxide in the air and then a warning device is actuated while the intensity of said second infra-red rays remains beyond a predetermined level.

3 Claims, 9 Drawing Figures

FLAME SENSING SYSTEM

This invention relates to a flame sensing system utilizing infra-red rays emitted by resonant radiation of carbon dioxide (hereinafter referred to as $CO_2$) irradiated from $CO_2$ in a flame.

It has been known that resonant radiation of a particular wavelength is taking place from $CO_2$ in the flame being in a high temperature condition. Radiant rays generated by such resonant radiation can exist from the area of ultraviolet to infra-red, and the present invention is concerned with a flame sensing system utilizing resonant radiation of infra-red rays present in the vicinity of 2μ or 4.4μ.

Heretofore there have been proposed a number of flame sensors utilizing radiant rays. One of them makes use of ultraviolet rays, another makes use of flicker of visible rays, still another makes use of near infra-red rays and still another makes use of flicker of infra-red of wavelength in the vicinity of 4.4μ.

These sensors have some drawbacks in respect of decrease of wrong information and increase in sensitivity. Taking a flame sensor utilizing ultraviolet rays as an example, a thunder or an electric spark caused wrong operation. As for the flame sensor utilizing flicker of visible rays or infra-red rays, wrong operation took place with the sunlight or artificial light. The flame sensor utilizing ultraviolet rays has drawbacks in that ultraviolet rays of shorter wavelength contained in the smoke coming out of the flame are apt to be absorbed and range of sensitivity is therefore restrained.

The present invention precludes these drawbacks and intends to provide a flame sensing system which enables avoidance of wrong information caused by a thunder discharge or the sunlight and sensing of a flame with high sensitivity and a good S/N ratio.

According to the aspect of the invention, the flame sensing system is adapted to detect difference in intensity between a first infra-red rays of a first wavelength produced by resonant radiation of $CO_2$ and a second infra-red rays of the wavelength located in the vicinity of said first wavelength in the region of wavelength in which little portion of the wavelength is absorbed by $CO_2$ in the air so as to actuate a warning device and is characterized in that a flame is detected for a short time continuously in terms of difference in intensity between the first infra-red rays and the second infra-red rays and then a warning device is actuated while the intensity of the second infra-red remains beyond a predetermined level.

BRIEF DESCRIPTION OF THE DRAWINGS

FIG. 6 is an illustration of spectra of flame of gasoline and so on;

The invention will now be described in detail by reference to the drawings. First of all explanation will be given to a flame sensor of basic type of the present invention.

Figure 1:
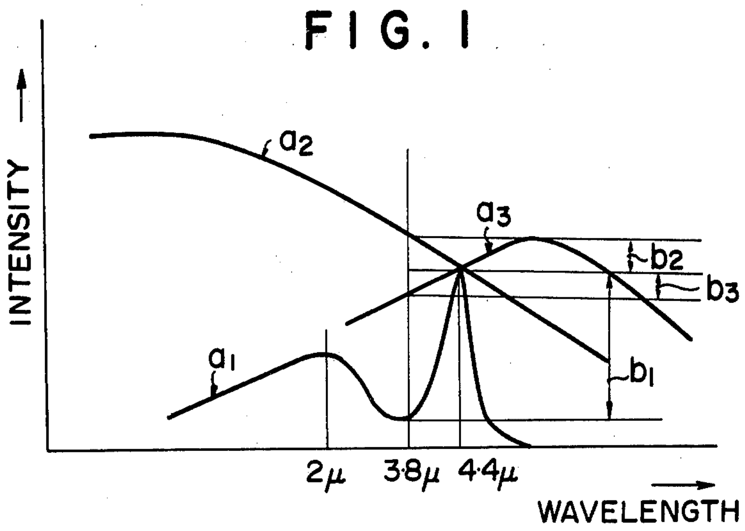
FIG. 1 shows radiation spectra of various radiant bodies.

FIG. 1 shows radiation spectra of various typical irradiant bodies.

al represents a spectrum of a flame burning accompanied with oxidation which contains intensive resonant radiation of $CO_2$ at the wavelength of 4.4μ and in the vicinity of 2μ. $a_2$ represents a spectrum of the sunlight or an irradiant bodies such as for example an electric stove having a temperature higher than 1000° C. The spectrum at the wavelength near 4.4μ has intensity considerably smaller than that of visible rays but exists in the form of continuous spectrum.

$a_3$ represents radiation of a black body having a temperature for example about 300° C. considerably lower than an electric stove which radiation has a continuous spectrum having a peak at the longer wavelength than 4.4μ.

In FIG. 1 three spectra having the same intensity at the wavelength of 4.4μ are illustrated by way of example. With the radiation incoming as illustrated, if a flame is detected with the radiation having passed the band-pass filter of 4.4μ, it follows that every irradiant body having the spectrum $a_1$, $a_2$ and $a_3$ is sensed as a flame.

For this reason, according to the invention, there is provided a band-pass filter having a pass band at an appropriate wavelength near 4.4μ, for example about 3.8μ or 4.1μ and difference in intensity is made between the radiation having passed the band-pass filter and the radiation having passed a filter of 4.4μ. In this way distinction of three radiations having spectra $a_1$, $a_2$ and $a_3$ shown in FIG. 1 is made.

By the provision of the above-mentioned means, difference between the amount of passage of 4.4μ as shown by $b_1$ of FIG. 1 and that of 3.8μ is detected in case of for example a flame. In case of the spectrum $a_2$, the spectrum in the vicinity of 4.4μ is a continuous spectrum and the above-mentioned difference is considerably smaller than the difference $b_1$ as shown by $b_2$. Generally the amount having a sign opposite to that of the difference $b_1$ is detected and, as far as the spectrum $a_3$ is concerned, the difference $b_3$ has the same sign as the difference $b_1$ but is considerably small as compared with the difference $b_1$. In this manner, the spectrum $a_1$ can be distinguished from the spectra $a_2$ and $a_3$.

Figure 2:
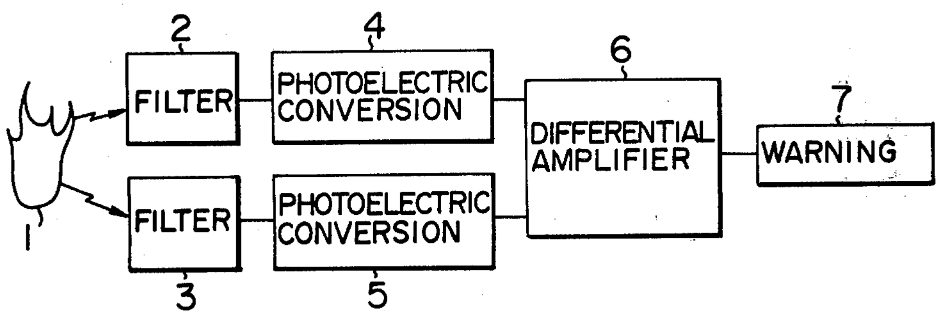
FIG. 2 is a block diagram used for explanation of the principle of a flame sensor.

FIG. 2 is a block diagram showing a device constituted based on the above-mentioned principle. In FIG. 2, reference numeral 1 designates an irradiant body, reference numeral 2 designates a band-pass filter of 4.4μ, 3 is a band-pass filter of a wavelength different from 4.4μ, 4, 5 indicate photoelectric conversion device for rays having passed the band-pass filters 2, 3, 6 is a differential amplifier adapted to take and amplify the difference between the outputs of the photoelectric conversion devices 4, 5 and 7 is a warning device adapted to work when the differential amplifier has an output being over a predetermined level.

Referring to FIG. 2, when the irradiant body is a flame, there is a great difference in intensity of the radiations having passed the band-pass filters 2, 3 and thus a large output will appear at the output of the differential amplifier 6 and actuate the warning device 7.

In brief, intensity of radiations at a plurality of points of wavelength of the spectrum emitted by a certain radiant source is measured by use of a plurality of band-pass filters and it is detected by taking difference therebetween whether the spectrum of the irradiant body is a line spectrum of the wavelength peculiar to the flame or a continuous spectrum. If the line spectrum is detected, a flame can be sensed.

In the block diagram shown in FIG. 2, the number of the photoelectric conversion devices 4, 5 is the same as that of the band-pass filters 2, 3, however, a single photoelectric conversion device may be used to treat with the amount of rays having passed a plurality of band-pass filters.

Figure 3:
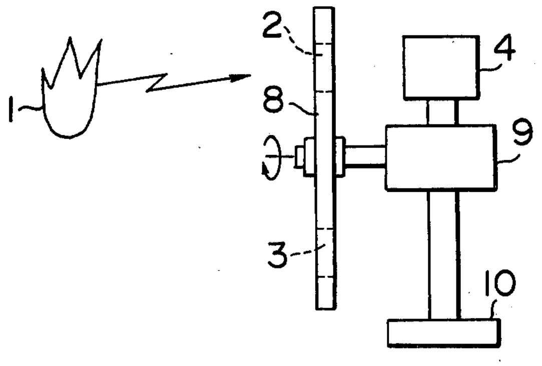
FIG. 3 is a schematic illustration of the structure of an embodiment of a flame sensor to which the present invention is applicable.

FIG. 3 is a schematic illustration of the structure of a flame sensor to which the present invention is applicable and particularly intended for explanation of the relationship between the band-pass filters 2, 3 and the photoelectric conversion device 4.

In FIG. 3, reference numeral 8 designates a rotatable board on which band-pass filters 2, 3 are mounted, 9 is an electric motor for rotating the rotatable board 8 and 10 is a base mount. A single photoelectric conversion device 4 is provided for a plurality of band-pass filters. The photoelectric conversion device 4 is so positioned that the band-pass filters 2, 3 take alternate positions in front of the device 4 when the rotatable board 8 is rotated.

In other words, the photoelectric conversion device 4 sees the irradiant body through the band-pass filters 2 and 3 alternately. If it is assumed that outputs of the photoelectric conversion device 4 derived by use of the band-pass filters 2, 3 are $e_2$ and $e_3$, they will appear as shown in FIG. 4.

Figure 4:
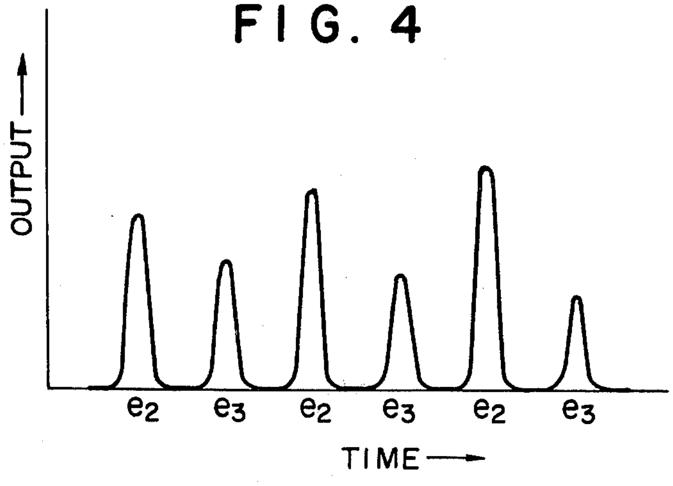
FIG. 4 is an illustration of the outputs of a photoelectric conversion device.

In FIG. 4, an abscissa represents time and an ordinate represents an output of the photoelectric conversion device 4.

Figure 5:
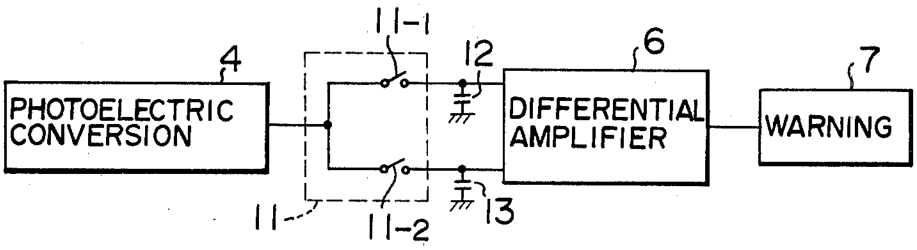
FIG. 5 shows an example of a circuit for treating the output of the photoelectric conversion device.

The output of the photoelectric conversion device 4 as shown in FIG. 4 is treated by the circuit as shown in FIG. 5.

In FIG. 5, reference numeral 11 is a switch synchronized with the rotating board 8. Arrangement is made so that when the band-pass filter 2 has reached just in front of the photoelectric conversion device 4, a switch 11-1 closes temporarily and then opens and on the other hand, when the band-pass filter 3 has reached just in front of the photoelectric conversion device 4, another switch 11-2 closes temporarily and then opens.

The output of the photoelectric conversion device 4 obtained at the time of closure of the switch 11-1 or 11-2 is stored in a capacitor 12 or 13. Namely, the capacitors 12, 13 and the switch 11 forms a sort of a sample holding circuit. The outputs of the capacitors 12 and 13 are led to two input terminals of the differential amplifier 6, respectively, and difference therebetween is amplified and the output is effective to operate the warning device 7. The system shown in FIG. 3 is effective not only to reduce the number of the photoelectric conversion devices but also to remove the influence due to unevenness of performance of the photoelectric conversion devices.

In the systems as above described, two band-pass filters have been used. However, a single photoelectric conversion device will be sufficient for more than three band-pass filters if a rotary disc having them mounted thereon is used.

Next a method of removing the influence due to $CO_2$ in the air according to the sensing system of the present invention will now be described.

When a fuel such as gasoline having high contents of carbon is caused to burn normally in the air with a natural draught, it burns with black smoke and a flame assumes a red color. The spectrum of the flame is shown by C1 in FIG. 6. On the contrary, a blue or pale flame such as a flame of alcohol has its spectrum shown by C2 in FIG. 6. There is a big difference in strength of the radiation in the vicinity of the wavelength of 3.8μ between the two spectra. More particularly, taking a gasoline as an example, a continuous spectrum is being radiated as a high temperature body from carbon particles in the flame.

Figure 6:
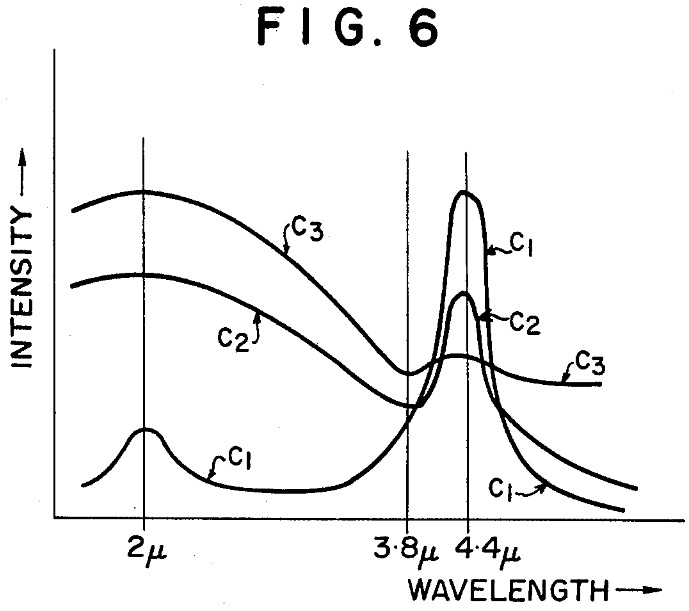

In FIG. 6, C1 represents a spectrum of a flame of gasoline when observed at the place several meters apart from the flame. In this case, intensity of radiation at wavelength of 4.4μ is sufficiently large as compared with that at wavelength of 3.8μ and occurrence of a flame can be sensed with sufficiently high sensitivity by means of the value made by subtraction of the intensity at 3.8μ from that at 4.4μ.

However, with the distance between the flame and the sensor increasing, the radiation at the wavelength of 4.4μ is selectively absorbed due to $CO_2$ in the air. On the other hand, there is no absorption of the radiation at the wavelength of 3.8μ due to $CO_2$ and the spectrum of the flame entering the sensor will be indicated by C3 in FIG. 6. A flame of substances such as gasoline cannot be sensed by the method of FIG. 3 at the place over a certain distance apart from the flame however large the flame is.

However, investigation made into combustion of gasoline reveals that sufficient air is supplied as compared with vapour of evaporating gasoline during about two or three seconds just after ignition of the gasoline and no black smoke is produced. The spectrum will be like C2 in FIG. 6. Accordingly if it is arranged that occurrence of a flame is sensed shortly after ignition, something like a flame of gasoline can be sensed. Experiment showed that the distance at which the intensity at 3.8μ becomes substantially equal to that at 4.4μ was approximately 30 m to 50 m under the normal condition with a flame of gasoline in a dish.

However, the intensity at 3.8μ is small as compared with that at 4.4μ shortly after ignition of gasoline as above mentioned, it is possible to detect a flame attributable to the ignition of gasoline even from a position approximately 200 m apart therefrom. The flame of gasoline in the dish will burn with a considerable amount of black smoke as a great amount of vapour of gasoline will be produced by radiation heat of the flame as time passes and correspondingly sufficient air is not supplied. As a result, intensity of radiation at 3.8μ will become higher. Under the situation, the gasoline flame far from the sensor cannot be sensed by the sensor of FIG. 5. In order to remove this drawback, according to the sensing system of the invention, a warning maintaining circuit is incorporated. As long as the intensity of radiation at 3.8μ detected is higher than a certain level after a flame attributable to initial combustion of gasoline is once detected and then warning operation is initiated, the warning maintaining circuit can serve to maintain the initial warning. The block diagram of the circuit is shown in FIG. 7.

Figure 7:
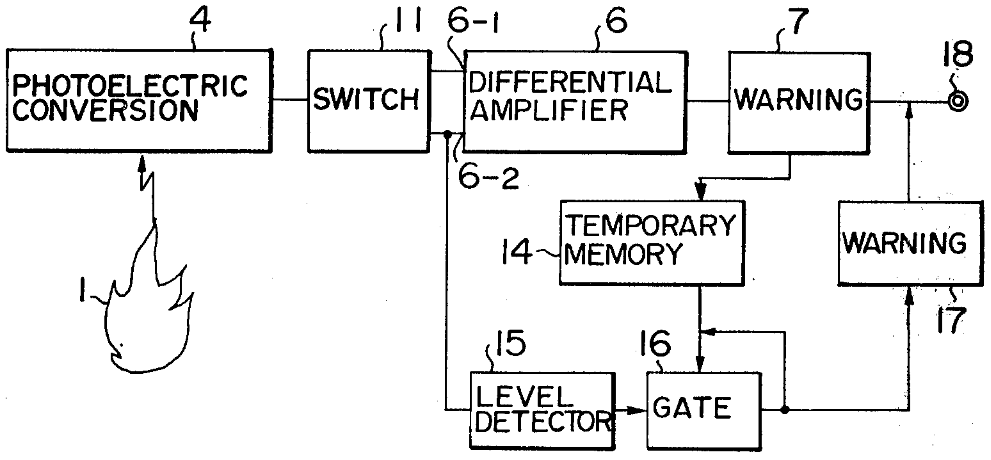
FIG. 7 is a block diagram of an embodiment of the invention.

In FIG. 7, reference numeral 14 designates a temporary memory device to deliver an output for a constant time (about several seconds) in response to the output from the warning device 7, reference numeral 15 designates a level detector which delivers an output when the intensity of 3.8μ entering one input of the differential amplifiers 6 exceeds a predetermined level, 16 is a gate circuit adapted to open by means of the output from the temporary memory device, 17 is a warning device adapted to operate by the output of the gate circuit 16 and 18 is an output terminal for warning.

Explanation will now be given to operation by reference to FIG. 7. When the gasoline present far from the sensor starts burning, the intensity at the wavelength of 4.4μ is higher than that at the wavelength of 3.8μ and the warning device 7 will operate by the output of the differential amplifier 6. Then the temporary memory device 14 receives the output of the warning device 7 and operates and continues to feed an output to the gate circuit 16 for several seconds to ten seconds. During this period the flame of the gasoline becomes gradually large and as the output at 3.8μ increases the output of the differential amplifier 6 decreases with the result that the warning device will become inoperative. On the other hand, the level detector 15 receives the above-mentioned output at 3.8μ and operates and feeds an output to the gate circuit 16. At this instant since the gate circuit 16 is open by the output of the temporary memory device 14, the output of the level detector is fed to the warning device 7 to operate it. At this instant, the warning device 17 is already inoperative, however, the warning device 17 maintains warning while the gasoline continues burning and an output at 3.8μ is being given. During this while the gate circuit 16 continues to open a gate by means of a part of its own output. When the flame of gasoline turns off, no output is derived from the level detector 15 and there will be no output to the gate circuit 16 which will in turn close and the warning device 17 will cease warning operation.

Figure 8:
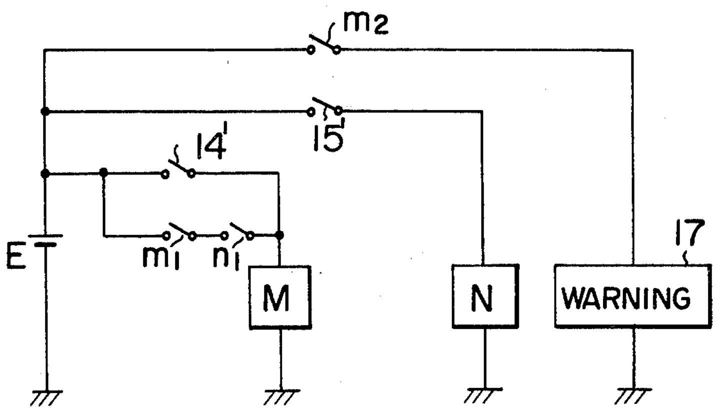
FIG. 8 is an example of a circuit for continuing warning.

FIG. 8 is a circuit diagram of a relay circuit into which the foregoing circuit is realized. In FIG. 8, M designates a relay having a set of make contacts $m_1$ and $m_2$, N designates a relay having a single make contact $n_1$, reference numeral 14' designates a contact adapted to hold a closed condition for a fixed time when the temporary memory circuit 14 operates and reference numeral 15' designates a contact which is closed when the level detector operates.

When the temporary memory device 14 is operated by the output of the warning device 7 and the contact 14' operates, the relay M will operate and actuate the warning device 17 with contact $m_2$. At the same time the contact $m_1$ is closed. Thereafter the level detector 15 will operate by radiation of 3.8μ from the flame and the contact 15' is closed with the result that the relay N operates and the contact $n_1$ is closed. Then even if the contact 14' is opened afterwards, the relay M maintains the operating condition through the contact $m_1$ and $n_1$. Accordingly the contact $m_2$ also maintains the operation and the warning device 17 maintains the warning condition. With the flame off, when the level detector 15 becomes inoperative and the contact 15' is opened, the contact $n_1$ is opened and the relay M restores the circuit to its initial condition.

It has been stated for convenience of explanation that the warning device 7 is separate from the warning device 17, however, it is evident from the description of FIG. 8 that these two warning devices may be quite the same.

It is needless to say that an electronic device may be substituted for the relay.

It is possible to detect a fire of gasoline at the place 100 m apart by maintaining the warning while the flame is recognized when the intensity of radiation at 4.4μ has a certain value exceeding the intensity of radiation at 3.8μ and at the same time the intensity of radiation at 3.8μ is continuously high subsequently.

An experiment reveals that a flame of wood, paper or the like is sufficiently smaller at the wavelength of 3.8μ than at the wavelength of 4.4μ as compared with the flame of gasoline and it is of course possible to sufficiently sense a flame remote from the sensor with the sensing device according to the present invention.

There has been described in the foregoing method of sensing a flame by comparing intensity of radiations of the wavelengths 4.4μ and 3.8μ with each other. However, the present invention is not limited to the wavelengths of 4.4μ and 3.8μ and can be realized likewise at the wavelengths of 4.4μ and 4.1μ. Radiation of the wavelength of 4.25μ to 4.5μ is preferably used to catch resonant radiation of $CO_2$ and one of the most preferable wavelengths is typically 4.4μ. Another preferable wavelength may be 3.8μ or 4.1μ, and generally speaking the wavelength of 4.1μ is a little rather preferable.

Instead of sensing by comparison of two wavelengths as above described, three wavelengths, for instance 4.1μ, 4.4μ and 4.6μ may be used. In this case it is possible to calculate the intensity of a noise at the wavelength of 4.4μ by way of interpolation for the noise such as for example a radiation of an electric stove whose spectrum intensity can be estimated by a straight line in the vicinity of the wavelength of 4.4μ. Therefore S/N ratio can be improved more than by use of two wavelengths.

Figure 9:
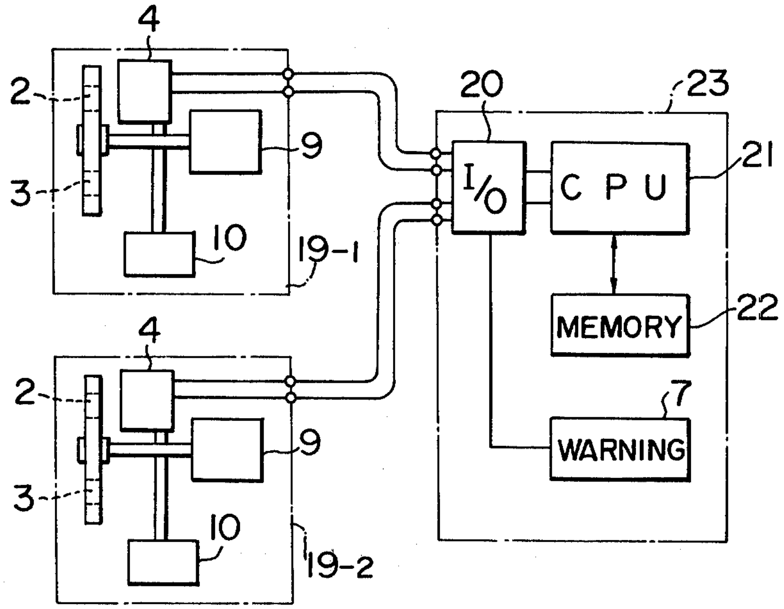
FIG. 9 is a view intended to explain a centralized treatment system for flame sensing.

FIG. 9 is a schematic diagram of another arrangement. In FIG. 9, reference numeral 19 designates a sensing head constituted by band-pass filters 2, 3, a rotary disc 8, a motor 9 and a base mount 10. Reference numeral 20 designates an input device which will be called I/O hereinafter, reference numeral 21 designates a central processing unit which will be called CPU hereinafter, reference numeral 22 designates a memory device and reference numeral 23 designates a receiving device.

Signals of 4.4μ and 3.8μ are transmitted from the sensing heads 19-1 and 19-2 to the receiving device 23 via lines. In the receiving device 23, the signals from the sensing head 19 are passed into CPU 21 through I/O 20 and CPU 21 compares a difference signal between at the wavelength of 4.4μ and 3.8μ by way of operation with the memory device 22 and determines whether a warning is given or not as a result of calculation of the magnitude of the signal at the wavelength of 3.8μ only. More particularly, when the difference signal between at the wavelengths of 4.4μ and 3.8μ is larger than a certain value and when the difference signal is larger than a certain value for several seconds and afterwards the signal at the wavelength of 3.8μ is larger than a certain value, the warning device 7 is actuated through I/O 20.

A micro-computer or the like may be used instead for I/O 20, CPU 21, the memory device 22 and so on. With a micro-computer used in the device shown in FIG. 9, it is usually possible to treat with signals of a plurality of sensing heads with a single receiving device. Signals may be transmitted from the sensing heads 19-1 and 19-2 to the receiving device either in the form of an analog signal or a digital signal produced by A/D conversion.

According to the present invention, it is possible to sense a flame of combustion of various substances such as wood or timber, paper, gasoline or plastics with high sensitivity by means of a circuit for detecting the difference between infra-red rays of wavelength of resonant radiation generated by carbon dioxide of high temperature and infra-red rays of wavelength located in the vicinity of said wavelength and within the region of wavelength in which there is little absorption by aqueous vapour or carbon dioxide in the air, a circuit for detecting intensity of the latter infra-red rays and a system for giving a warning when the former circuit has an output exceeding a predetermined value and the latter maintains an output of constant level after the former circuit maintains an output of constant level for a short time.

I claim:

1. A flame sensing apparatus comprising a warning device for indicating the existence of a flame, detecting means for detecting a difference in intensity between a first radiation of wavelengths produced by resonant radiation of carbon dioxide and a second radiation of wavelengths which are in the vicinity of the wavelengths of the first radiation and in which there is little absorption by the carbon dioxide in the air, a level detector for producing a warning device actuating signal when the intensity of the second radiation exceeds a predetermined level, gating means for controlling passage of said warning device actuating signal from said level detector to said warning device, and gate controlling means for opening said gating means for a predetermined time when said difference detected by said detecting means exceeds a predetermined value, thereby permitting said warning device actuating signal to pass through said gating means to be applied to said warning device so that the warning device may provide an indication of the existence of a flame.

2. A flame sensing apparatus as claimed in claim 1 wherein said detecting means comprise a first band-pass filter allowing said first radiation to pass therethrough, a second band-pass filter allowing said second radiation to pass therethrough, a first photoelectric conversion device for measuring the intensity of the radiation passing said first band-pass filter, a second photoelectric conversion device for measuring the intensity of the radiation passing said second band-pass filter and a differential amplifier fed by said two photoelectric conversion devices providing the difference between the outputs of said two conversion devices and amplifying the difference, and said level detector being operatively connected to the output of said second photoelectric conversion device.

3. A flame sensing apparatus as claimed in claim 1 wherein said detecting means comprise a rotary disc having first and second band-pass filters mounted thereon, said first band-pass filter allowing said first radiation to pass therethrough, said second band-pass filter allowing said second radiation to pass therethrough, a single photoelectric conversion device for measuring the intensity of the radiation passing said band-pass filters, a sample holding circuit consisting of a switch operated in synchronism with said rotary disc and a pair of condensors for storing the outputs of said photoelectric conversion device under the control of said switch so that one of said condensors stores the output of said photoelectric conversion device when receiving the radiation passing said first band-pass filter and the other condensor stores the output of said photoelectric conversion device when receiving the radiation passing said second band-pass filter and a differential amplifier fed with the outputs of said condensors providing the difference therebetween, and said level detector being operatively connected to the output of said other condensor.

* * * * *